United States Patent
Benisty

(10) Patent No.: US 10,725,835 B2
(45) Date of Patent: Jul. 28, 2020

(54) SYSTEM AND METHOD FOR SPECULATIVE EXECUTION OF COMMANDS USING A CONTROLLER MEMORY BUFFER

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/585,827

(22) Filed: May 3, 2017

(65) Prior Publication Data

US 2018/0321987 A1 Nov. 8, 2018

(51) Int. Cl.
*G06F 3/06* (2006.01)
*G06F 9/52* (2006.01)

(52) U.S. Cl.
CPC .............. *G06F 9/528* (2013.01); *G06F 3/061* (2013.01); *G06F 3/0659* (2013.01); *G06F 3/0679* (2013.01)

(58) Field of Classification Search
CPC ........ G06F 9/528; G06F 3/061; G06F 3/0659; G06F 3/0679
See application file for complete search history.

(56) References Cited

U.S. PATENT DOCUMENTS 7,386,674 B1 6/2008 Lango
8,554,968 B1* 10/2013 Onufryk ................ G06F 13/24
710/260
9,996,262 B1* 6/2018 Nemawarkar ........ G06F 3/0604

(Continued)

FOREIGN PATENT DOCUMENTS

EP 2312457 A2 4/2011

OTHER PUBLICATIONS

"NVM ExpressTM : Unlock the Potential," compilation of several articles from Forum A-11, 2014 Flash Memory Summit, Aug. 4-7, 2014, Santa Clara, CA, 91 pages.*
NVM Express standard, Revision 1.2, Nov. 3, 2014, pp. 1-205.*
Ellefson, Janene; SSD Product Market Manager—PCIe, Micron Technology, "NVM Express: Unlock Your Solid State Drives Potential", Flash Memory Summit 2013, Santa Clara, CA., 114 pages.

(Continued)

*Primary Examiner* — Glenn Gossage
(74) *Attorney, Agent, or Firm* — Brinks Gilson & Lione

(57) ABSTRACT

Systems and methods for speculative execution of commands using a controller memory buffer are disclosed. Non-Volatile Memory Express (NVMe) implements a paired submission queue and completion queue mechanism, with host software on a host device placing commands into the submission queue and thereafter notifying a memory device of the commands placed in the submission queue. The submission queue may be resident in the memory device, such as in the controller buffer memory. Prior to notice by the host device, the memory device may determine that the commands have been placed in the submission queue and may speculatively execute the commands. Determining whether to begin processing a command prior to the host device notifying the memory device that the command is posted to the submission queue may be based on a type of command, such as a read or write command. The host device may override a command, such as a flush command, posted to the submission queue, and processing of the command canceled.

19 Claims, 9 Drawing Sheets

(56) References Cited

U.S. PATENT DOCUMENTS

| | | | |
|---|---|---|---|
| 2002/0161979 A1* | 10/2002 | Arimilli | G06F 13/161 711/154 |
| 2002/0199062 A1* | 12/2002 | Bormann | G06F 12/0884 711/118 |
| 2003/0204552 A1 | 10/2003 | Zuberi | |
| 2005/0195635 A1 | 9/2005 | Conley et al. | |
| 2006/0161733 A1 | 7/2006 | Beckett et al. | |
| 2009/0307523 A1* | 12/2009 | Allison | G06F 11/106 714/6.12 |
| 2012/0151472 A1 | 6/2012 | Koch et al. | |
| 2014/0281040 A1 | 9/2014 | Liu | |
| 2015/0067291 A1 | 3/2015 | Miyamoto et al. | |
| 2015/0074338 A1 | 3/2015 | Raviv et al. | |
| 2015/0081933 A1 | 3/2015 | Vucinic et al. | |
| 2015/0127882 A1 | 5/2015 | Carlson et al. | |
| 2015/0177994 A1* | 6/2015 | Vucinic | G06F 3/0613 711/103 |
| 2015/0178017 A1* | 6/2015 | Darrington | G06F 3/0659 710/5 |
| 2015/0186068 A1* | 7/2015 | Benisty | G06F 3/0673 711/154 |
| 2015/0186074 A1* | 7/2015 | Benisty | G06F 3/0659 711/115 |
| 2015/0254088 A1 | 9/2015 | Chou et al. | |
| 2016/0004438 A1 | 1/2016 | Moon et al. | |
| 2016/0026388 A1 | 1/2016 | Jeong et al. | |
| 2016/0062669 A1* | 3/2016 | Chu | G06F 3/0611 711/103 |
| 2016/0077740 A1 | 3/2016 | Hussain et al. | |
| 2016/0085718 A1 | 3/2016 | Huang | |
| 2016/0124876 A1 | 5/2016 | Vucinic et al. | |
| 2016/0140041 A1 | 5/2016 | Niu et al. | |
| 2016/0147442 A1 | 5/2016 | Baderdinni et al. | |
| 2016/0162219 A1* | 6/2016 | Erez | G06F 3/0653 711/103 |
| 2016/0188510 A1 | 6/2016 | Singh et al. | |
| 2016/0216905 A1 | 7/2016 | Yazdani et al. | |
| 2016/0267016 A1 | 9/2016 | Lee et al. | |
| 2016/0291866 A1* | 10/2016 | Olcay | G06F 3/061 |
| 2016/0292007 A1 | 10/2016 | Ding et al. | |
| 2016/0321010 A1 | 11/2016 | Hashimoto | |
| 2016/0321012 A1 | 11/2016 | Clark et al. | |
| 2017/0060422 A1 | 3/2017 | Sharifie et al. | |
| 2017/0060749 A1 | 3/2017 | Segev et al. | |
| 2017/0075629 A1 | 3/2017 | Manohar et al. | |
| 2017/0075828 A1 | 3/2017 | Monji et al. | |
| 2017/0083252 A1 | 3/2017 | Singh et al. | |
| 2017/0123659 A1 | 5/2017 | Nam et al. | |
| 2017/0131917 A1* | 5/2017 | Yun | G06F 3/0611 |
| 2017/0177222 A1 | 6/2017 | Singh et al. | |
| 2017/0286205 A1* | 10/2017 | Jeong | G06F 11/0772 |
| 2018/0059987 A1* | 3/2018 | Nimmagadda | G06F 3/0626 |
| 2018/0074757 A1 | 3/2018 | Yamaguchi et al. | |
| 2018/0136875 A1 | 5/2018 | Nimmagadda et al. | |
| 2018/0173461 A1 | 6/2018 | Carroll et al. | |
| 2018/0275921 A1* | 9/2018 | Katagiri | G06F 3/0659 |
| 2019/0155760 A1* | 5/2019 | Chang | G06F 13/16 |
| 2020/0042177 A1* | 2/2020 | Benisty | G06F 13/4295 |

OTHER PUBLICATIONS

Marks, Kevin; Dell, Inc., "An NVM Express Tutorial", Flash Memory Summit 2013, Santa Clara, CA., 92 pages.

U.S. Appl. No. 15/148,409, filed May 6, 2016, 45 pages.

Specification and Drawings of U.S. Appl. No. 15/457,676 entitled "Storage System and Method for Thermal Throttling via Command Arbitration" filed Mar. 13, 2017; 32 pages.

International Search Report and Written Opinion for Application No. PCT/US2018/019930 dated Jun. 4, 2018, 16 pages.

International Search Report and Written Opinion in Application No. PCT/US2018/019933 dated May 22, 2018, 12 pages.

International Search Report and Written Opinion in Application No. PCT/US2018/019905 dated May 4, 2018, 13 pages.

International Search Report and Written Opinion in Application No. PCT/US2018/019941 dated Jul. 13, 2018, 18 pages.

International Search Report and Written Opinion in Application No. PCT/US2018/019914 dated Jul. 13, 2018, 18 pages.

International Search Report and Written Opinion in Application No. PCT/US2018/019909 dated Jul. 6, 2018, 18 pages.

International Search Report and Written Opinion in Application No. PCT/US2018/019911 dated May 28, 2018, 15 pages.

* cited by examiner

SYSTEM AND METHOD FOR SPECULATIVE EXECUTION OF COMMANDS USING A CONTROLLER MEMORY BUFFER

BACKGROUND

Non-Volatile Memory (NVM) Express (NVMe) is a standard for accessing non-volatile storage media attached via a Peripheral Component Interconnect (PCI) Express (PCIe) bus. NVMe may be used with a variety of non-volatile storage media, such as solid state drives (SSDs). One focus of NVMe relates to input/output (I/O) communication between a host device (which may access and/or write to the non-volatile storage media) and a memory device (which includes the non-volatile storage media). In that regard, NVMe implements a paired submission queue and completion queue mechanism, with host software on the host device placing commands into the submission queue. Completions are placed onto the associated completion queue by the memory device controller.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Overview

Figure 1A:
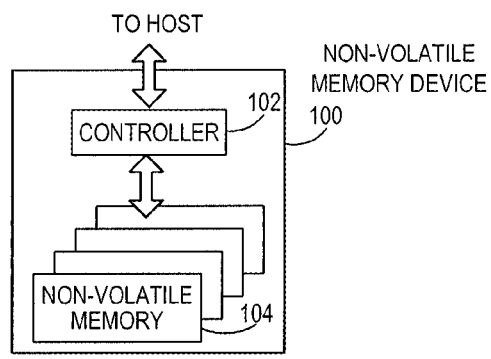
FIG. 1A is a block diagram of an exemplary non-volatile memory device.

NVMe is based on a paired submission queue (SQ) and completion queue (CQ). The host device, using host software, places commands into a respective submission queue. The memory device, via the memory device controller, places entries into or on the associated completion queue, with the entries indicative of completed execution of commands. In one implementation, submission queues and completion queues are allocated in the host device memory, such as in a host memory buffer. The allocation for the queues in the host memory buffer may be physically located contiguously or non-contiguously. Thus, for submission queues residing in host memory, the memory device controller performs a PCI Express (PCIe) read from host memory in order to fetch the queue entries.

Alternatively, the submission queues and completion queues may be stored in the memory device. For example, the Controller Memory Buffer (CMB) enables the host device to place the submission queues and completion queues in controller memory. Thus, a controller memory based queue is used in the same manner as a host memory based queue, with the difference being that the memory address used is located within the memory device (e.g., within the memory device controller's own memory rather than in the host memory). In particular, the Admin and/or I/O Queues may be placed in the CMB, as discussed in more detail below. Thus, in one implementation, for a particular queue, all memory associated with the particular queue resides entirely in either the CMB or in host memory. Submission queues in controller memory enable the host software to directly write the entire submission queue entry to the memory device controller's internal memory space, thereby avoiding one read from the memory device controller to the host device.

Example types of queues include admin queues and I/O queues. The admin queue, such as the admin submission and completion queues, is an administrative submission queue, which includes administrative commands to the memory device. Example administrative commands include, but are not limited to: Get Log Page (e.g., retrieves an NVMe log page from an NVMe device and provides the returned structure); Identify (e.g., returns a data buffer that describes information about the NVMe subsystem, the controller or the namespaces), Get Features (e.g., retrieves the attributes of the Feature specified) and Set Features (e.g., specifies the attributes of the Feature indicated). The administrative commands listed are merely for illustration purposes. The I/O queues may relate to data transfer, such as read commands (e.g., reading data from flash memory) and write commands (e.g., writing data to flash memory).

Typically, the host device first writes commands to the submission queue, and thereafter notifies the memory device by updating the submission queue tail doorbell register, as discussed in more detail below. In response to the notification by the host device of a command on the submission queue, the memory device controller begins to process the command. In one implementation, the memory write request to the submission queue tail doorbell register shall not have the relaxed ordering bit set, to ensure that it arrives at the memory device controller after all writes to the CMB.

In one implementation, the memory device controller begins to process a command prior to notification by the host device of the command in or on the submission queue (e.g., prior to notification via the submission queue tail doorbell register). For example, the memory device may determine whether the host device has written a command to the submission queue. This may be performed in one of several ways. In one way, the memory device may monitor the NVMe submission queues physically located in the controller memory buffer, thereby enabling the memory device to begin speculative execution of the commands even before receiving the corresponding notification from the host device (e.g., the doorbell write transactions). In another way, the memory device may monitor a communication interface between the host device and the memory device (e.g., the ingress of the PCIe bus) to determine whether the host device has sent any communications indicative of writing a command to a submission queue.

In response to the memory device determining that the host device has written command(s) to the submission queue(s), the memory device may parse the command(s), and responsive to determining that one or more new commands are on the submission queue, may begin the execution of the one or more new commands in a speculative manner.

Various commands may be subject to speculative execution. For instance, a read command may be subject to speculative read command execution, triggering a Read Look Ahead (RLA) algorithm. In particular, the relevant data subject to the read command may be fetched from the flash memory to a temporal buffer. When the host device notifies the memory device of the command (e.g., queues the relevant command by issuing a write transaction to the corresponding submission queue doorbell register), the data may be fetched immediately from the temporal buffer and provided to the host device. In this regard, the RLA hit may result in better flash memory latency (e.g., sense and transfer time) and thereby result in better performance. As another instance, a write command may be subject to speculative write command execution. For example, one or more steps for performing the write command, such as fetching the flash translation layer (FTL) table, may be performed prior to the host device queuing the command. Thus, the overall performance of the memory device may be improved.

In one implementation, the memory device selectively performs speculative execution of commands. In a first specific implementation, the memory device may analyze the command, and based on the type of command, may determine whether to speculatively begin execution of the command prior to notification of the host device, via the doorbell register, of placement of the command on the submission queue. As discussed herein, there are different types of commands, such as read commands, write commands, and the like. In NVMe, the read command includes a pointer to a physical region page (PRP) list, with the PRP list indicating the sections in host memory where the memory device is to write the data that was read from flash memory. Likewise, the write command includes a pointer to a PRP list that indicates the sections in host memory where the data to write to flash is located (i.e., the memory device uses the PRP list to read host memory locations for data, with the read data being written to flash memory).

In a second specific implementation, the memory device may analyze at least one aspect of the command, such as the priority of the command, may determine whether (or when) to speculatively begin execution of the command prior to notification of the host device, via the doorbell register, of placement of the command into or on the submission queue. As discussed in co-pending U.S. application Ser. No. 15/585,717 (pending), incorporated by reference herein in its entirety, the memory device may determine priority for a command (or for performing one or more phases) based on one or more criteria including any one, any combination or all of the following: (1) priority of the respective command; (2) internals of the memory device (e.g., the state of the die or the processing capability of the memory device, as discussed below); (3) power consumption; (4) state of the communication interface between the host device and the memory device (e.g., the status of the ingress and/or egress path); and (5) the phases of the commands subject to execution. Depending on the priority associated with the command, the memory device may determine whether a command is subject to speculative execution. In one example, the memory device determines the priority of a first command and a second command, the priority associated with the first command being higher than the priority associated with the second command. Based on the determined priorities, the memory device performs speculative execution of the first command prior to, or instead of, speculative execution of the second command. Alternatively, in the event that the memory device is performing speculative execution of the second command, the memory device may halt performing speculative execution of the second command and begin speculative execution of the first command in response to determining that the host device has placed the first command on the submission queue and in response to determining that the priority associated with the first command is higher than the priority associated with the second command.

Thus, in the first and second specific implementations, the memory device performs the speculative execution only on processes internal to the memory device, but not to processes that involve the host device (e.g., that are external to or involve communication with the host device). In that regard, any process involving the host device, such as a reading a PRP list on the host device, is not speculatively performed. However, an internal process, such as reading from flash memory, performing error correction or encryption/decryption, may be speculatively performed. In that regard, in a specific implementation, the memory device may perform speculative execution of a read command, but not perform speculative execution of a write command. More specifically, prior to receiving the doorbell notice from the host device, the memory device speculatively performs certain processes in executing the read command, such as performing the read from the flash memory, performing error correction and encryption, but does not perform other processes related to communication with the host device, such as reading of the PRP list that is resident on the host device.

One measure for NVMe command execution performance is the time between the host device issuing a doorbell write to a submission queue and the memory device posting a completion message to a completion queue. Using speculative execution, this time may be reduced. In this regard, speculative execution may improve performance for certain commands, such as read and write command, particularly in low queue depths. Further, command execution latency, which may be measured on the PCIe bus, may be improved for various command types (e.g., read, write, and Admin commands). Finally, the speculative execution may be implemented in either hardware or firmware, thereby simplifying implementation within the memory device.

Typically, if the host device writes a command to the submission queue, the host device will notify the memory device of the command (e.g., the command will eventually be queued-in by the host device writing to the relevant tail doorbell register). Atypically, the host device may write a command to the submission queue, and thereafter override the command with a different command and then queue the different command. Regardless, the speculative execution may account for this atypical situation.

Embodiments

The following embodiments describe non-volatile memory devices and related methods for processing of commands. Before turning to these and other embodiments, the following paragraphs provide a discussion of exemplary non-volatile memory devices and storage modules that can be used with these embodiments. Of course, these are just examples, and other suitable types of non-volatile memory devices and/or storage modules can be used.

FIG. 1A is a block diagram illustrating a non-volatile memory device 100. The non-volatile memory device 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host device or a host system and transmit command sequences for read, program, and erase operations to the non-volatile memory die(s) 104. As discussed below, the commands may include logical and/or physical addresses.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" may mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. One example of the firmware is a flash translation layer. In operation, when a host device needs to read data from or write data to the flash memory, it will communicate with the flash memory controller. In one embodiment, if the host device provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory device 100 may be a card based system, such as a secure digital (SD™) or a micro secure digital (micro-SD™) card. In an alternate embodiment, the system 100 may be part of an embedded memory device.

Although in the example illustrated in FIG. 1A, the non-volatile memory device 100 may include a single channel between the controller 102 and the non-volatile memory die(s) 104, the subject matter described herein is not limited to having a single memory channel. For example, in some NAND memory device architectures, 2, 4, 8 or more NAND channels may exist between the controller and the NAND memory die(s) 104, depending on controller capabilities. In any of the embodiments described herein, more than a single channel may exist between the controller and the memory die(s) 104, even if a single channel is shown in the drawings.

Figure 1B:
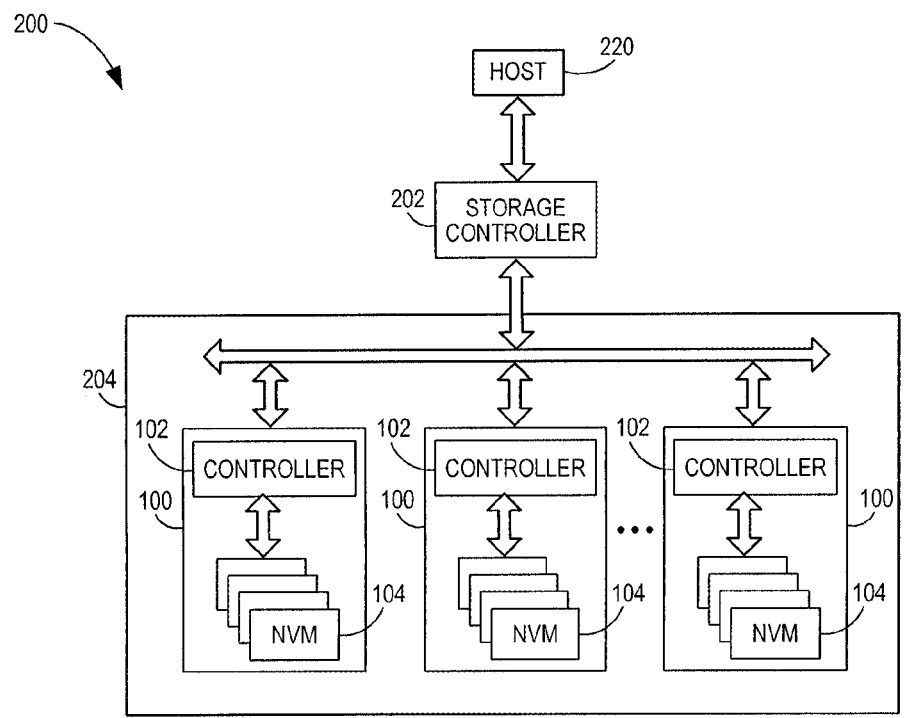
FIG. 1B is a block diagram of a storage module that includes a plurality of non-volatile memory devices and a host.

FIG. 1B illustrates a storage module 200 that includes plural non-volatile memory devices 100. As such, the storage module 200 may include a storage controller 202 that interfaces with a host 220 and with a storage system 204, which includes a plurality of non-volatile memory devices 100. The interface between the storage controller 202 and non-volatile memory devices 100 may be a bus interface, such as a serial advanced technology attachment (SATA) interface, a peripheral component interconnect express (PCIe) interface, an embedded MultiMediaCard (eMMC™) interface, a SD™ interface, or a Universal Serial Bus (USB) interface, as examples. The storage module 200, in one embodiment, may be a solid state drive (SSD), such as found in portable computing devices, such as laptop computers and tablet computers, and mobile phones.

Figure 1C:
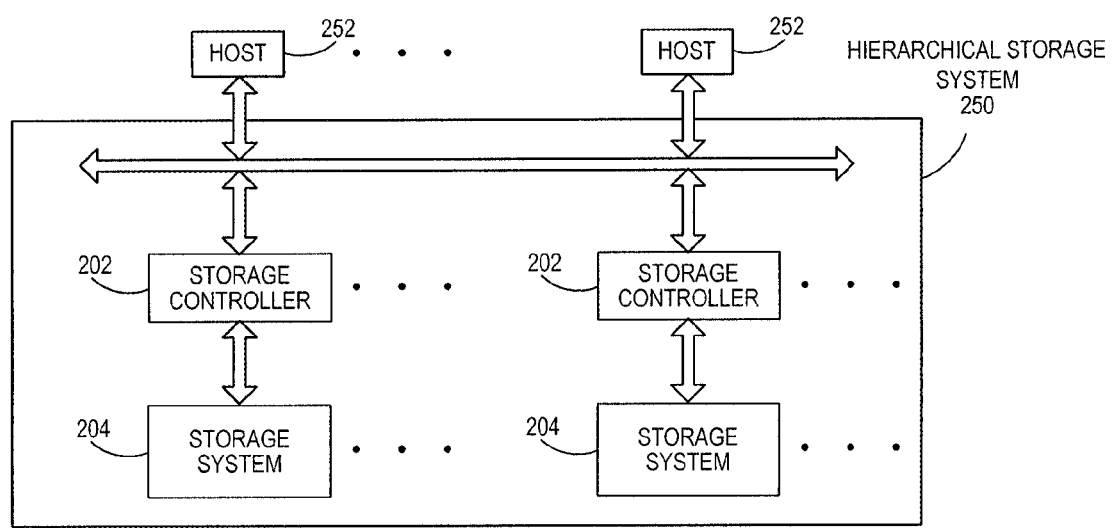
FIG. 1C is a block diagram of a hierarchical storage system.

FIG. 1C is a block diagram illustrating a hierarchical storage system 250. The hierarchical storage system 250 may include a plurality of storage controllers 202, each of which controls a respective storage system 204. Host systems 252 may access memories within the hierarchical storage system 250 via a bus interface. Example bus interfaces may include a non-volatile memory express (NVMe) interface, a fiber channel over Ethernet (FCoE) interface, an SD interface, a USB interface, a SATA interface, a PCIe interface, or an eMMC interface as examples. In one embodiment, the hierarchical storage system 250 illustrated in FIG. 1C may be a rack mountable mass storage system that is accessible by multiple host computers, such as would be found in a data center or other location where mass storage is needed. In one embodiment, host systems 252 may include the functionality described in host 220.

Figure 2A:
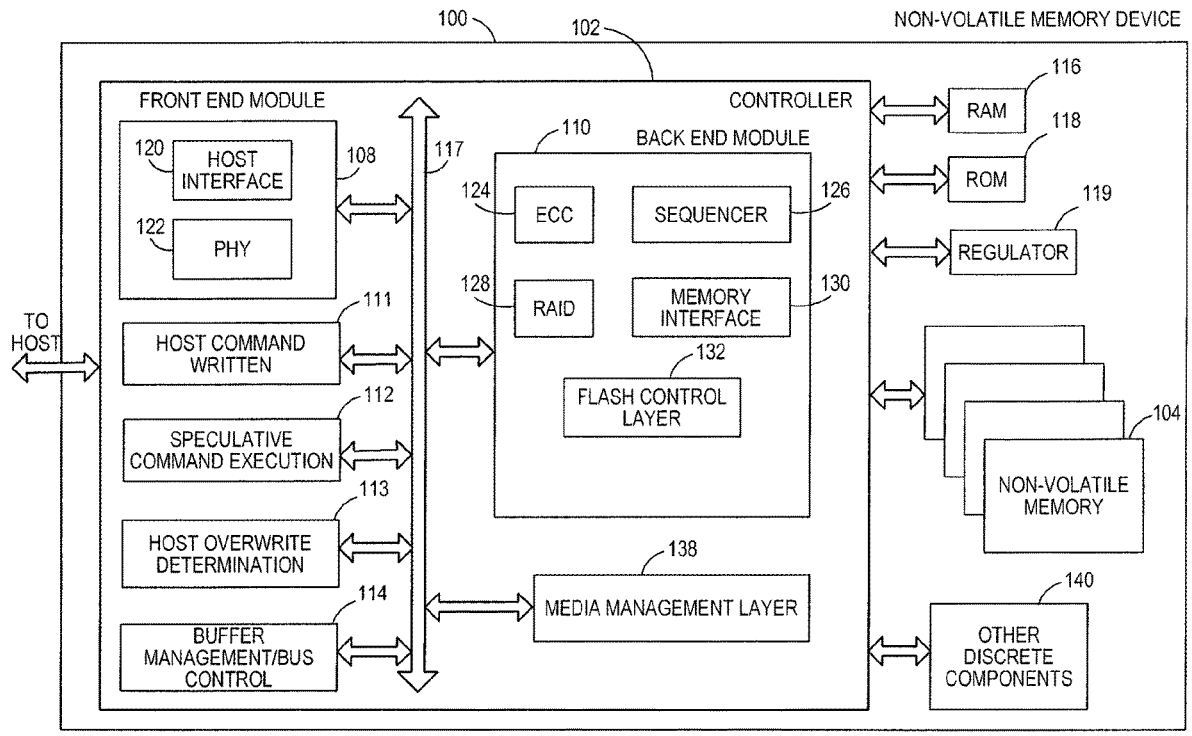
FIG. 2A is a block diagram of exemplary components of a controller of the non-volatile memory device of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory device 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the modules includes the portion of the memory that comprises instructions executable by the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer management/bus control module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies. As discussed below, in one implementation, the submission queues and the completion queues may be stored in the Controller Memory Buffer, which may be housed in RAM 116.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, Serial Attached SCSI (SAS), Fibre Channel, USB, PCIe, and NVMe. The host interface 120 may typically facilitate transfer for data, control signals, and timing signals.

The back end module 110 may include an error correction code (ECC) engine 124 that encodes the data bytes received from the host, and decodes and error corrects the data bytes read from the non-volatile memory die(s) 104. As discussed in more detail below, the ECC engine may be tunable, such as to generate different amounts of ECC data based on the mode (e.g., generate normal mode ECC data in normal programming mode and generate burst mode ECC data in burst programming mode, with the burst mode ECC data being greater than the normal mode ECC data). The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory device 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Thus, the controller 102 may include one or more management tables for managing operations of memory device 100. One type of management table includes a logical-to-physical address mapping table. The size of a logical-to-physical address mapping table may grow with memory size. In this regard, the logical-to-physical address mapping table for high capacity storage device (e.g., greater than 32 gigabyte (GB)) may be too large to store in static random access memory (SRAM), and may be stored in non-volatile memory 104 along with user and host data. Therefore, accesses to non-volatile memory 104 may first require reading the logical-to-physical address mapping table from non-volatile memory 104.

Additional modules of the non-volatile memory device 100 illustrated in FIG. 2A may include a media management layer 138, which performs wear leveling of memory cells of the non-volatile memory die 104. The non-volatile memory device 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Other modules of the non-volatile memory device 100 illustrated in FIG. 2A may include host command written module 111, speculative command execution module 112, and host overwrite determination module 113. These modules are shown as separate from the other modules of the non-volatile memory device 100, although in other configurations, one or more of them may be part of any of the other modules.

As discussed in more detail below, the memory device may determine whether the host device has written to the submission queue prior to the host device formally notifying the memory device using the host command written module 111. Further, in response to the memory device determining that the host has written a command to the submission queue, the speculative command execution module 112 may begin to execute the command prior to formal notice from the host device. In addition, the host overwrite determination module 113 may determine whether the host device has overwritten the command that is subject to speculative execution, as discussed in more detail below.

Figure 2B:
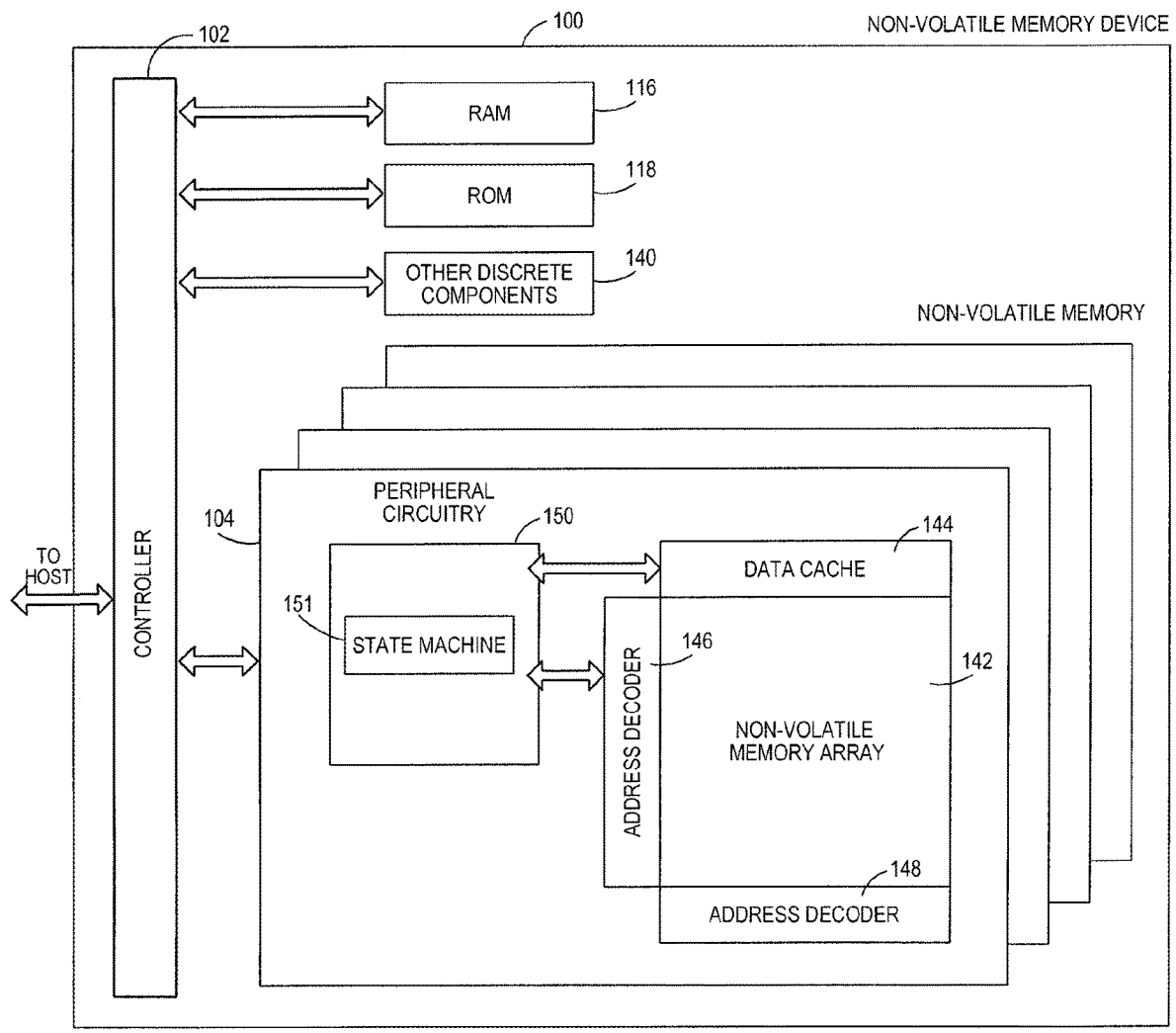
FIG. 2B is a block diagram of exemplary components of a non-volatile memory die of the non-volatile memory device of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge on the floating gate. The presence or absence of charges on the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

The non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 151 that provides status information to the controller 102. Other functionality of the state machine 151 is described in further detail below.

Figure 3:
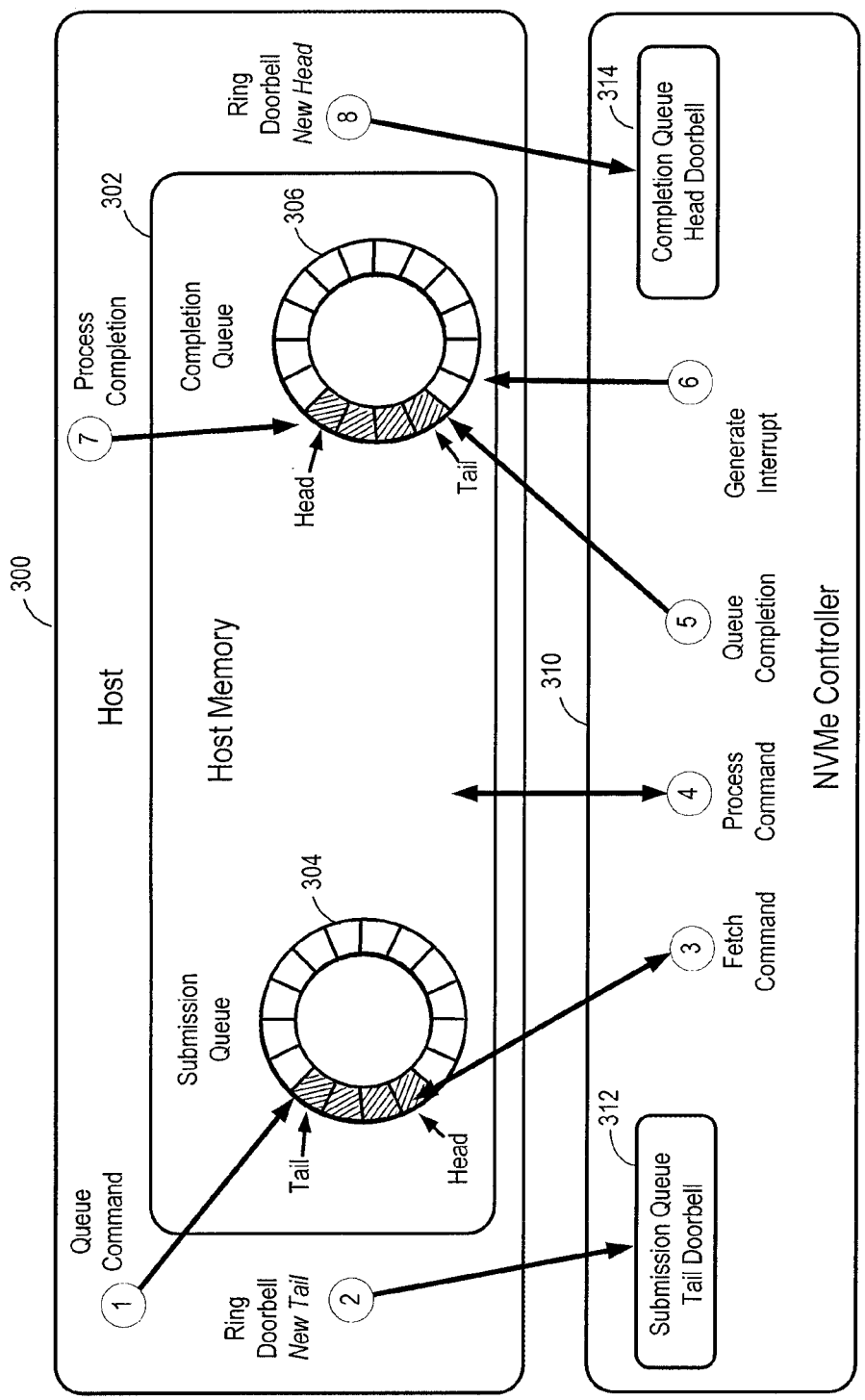
FIG. 3 is a block diagram of a host device and NVMe controller illustrating a sequence for the host device and a memory device to request and process an NVMe command.

FIG. 3 shows a host device and NVMe controller and illustrates a sequence of steps for executing a command via the NVMe standard. As shown, the host device 300 includes host memory 302, and the memory device includes a controller, such as an NVMe controller 310. In one implementation, the host memory 302 includes a submission queue 304 and a completion queue 306. In practice, at the initialization phase, the host device 300 creates one or more submission queues and one or more corresponding completion queues. As discussed above, in one implementation, the submission queues and completion queues may have a 1:1 correlation, and in another implementation, the submission queues and completion queues do not have a 1:1 correlation.

For initialization, the host device 300 may notify the memory device of the submission queue(s) and completion queue(s) by sending information, such as the base address for each queue to the memory device. In that regard, each submission queue has a corresponding completion queue. When the submission queue and the completion queue are resident in the host device, the host device sends information to the memory device in order for the memory device to determine the locations of the submission queue and the completion queue in the host device. In a specific implementation, the host device sends a command indicating the creation of the submission queue and the completion queue. The command may include a PRP1 pointer, which is a pointer to a list on the host device of the locations of the specific submission queue or the specific completion queue. In practice, the memory device sends a transport layer packet (TLP) read request using the PRP1 in order to obtain the PRP list, and stores the PRP list in the memory device to determine the memory locations within the host device for use in future commands to read from the specific submission queue or write to the specific completion queue. Alternatively, the host device 300 may instruct the memory device to create the submission queue(s) and corresponding completion queue(s) in a memory resident in the memory device, such as a controller memory buffer.

The submission queue 304 may be based on a ring buffer, such as shown in FIG. 3, with a head pointer and a tail pointer. After creating the submission queue(s) and notifying the memory device about the created submission queue(s), the host device 300 may write a command (or several commands) to the submission queue. This is indicated in FIG. 3 as step 1, labeled "Queue Command". In particular, FIG. 3 illustrates that four commands were written to the submission queue. In one implementation, the memory device is unaware that the host device 300 has updated the submission queue 304 with four commands, since the host device 300 updated its own host memory 302. In another implementation (such as when the submission queue(s) and completion queue(s) are resident in the controller memory buffer), the memory device may monitor a communication interface between the host device 300 and the memory device for particular communications, such as writing to the submission queue(s) resident on the memory device. For example, the memory device can monitor the transport layer packets (TLPs) on the PCI Express bus to determine whether the host device 300 has sent a TLP that results in an update to the submission queue resident in the controller memory buffer. In that regard, the memory device may identify one or more entries being written to the submission queue(s).

In step 2, the host device 300 writes to a submission queue tail doorbell register 312 in the memory device. This writing to the submission queue tail doorbell register 312 signifies to the memory device that the host device queued one or more commands in this specific submission queue 304 (e.g., 4 commands as illustrated in FIG. 3). The writing to the submission queue tail doorbell register 312 may take one of several forms. In one way, the host device 300 indicates a new tail for the submission queue 304, thereby indicating the number of commands written to the submission queue 304. Thus, since the memory device is aware of the base address for the submission queue 304, the memory device only needs to know the tail address to indicate the number of new commands written to the submission queue 304. After a command (or a set of commands) is processed, the memory device then sets the new head of the submission queue 304 accordingly, so that the tail pointer may represent an "offset" from the head pointer. In another way, the host device 300 indicates a number of commands written to the submission queue 304. In practice, each submission queue 304 has a corresponding submission queue tail doorbell register in the memory device, so that when the host device 300 updates a particular doorbell register (correlated to a particular submission queue 304), the memory device can determine, based on the doorbell register, which particular submission queue 304 has been updated.

After step 2 (whereby the memory device is notified of command(s) on the submission queue 304) and before step 3 (whereby the memory device fetches the command(s)), the memory device is aware that there are command(s) pending in the submission queue 304. In the general case, there may be several submission queues (with potentially many pending commands in the several submission queues). Thus, before performing step 3, the memory device controller may arbitrate between the various submission queues to select the particular submission queue from which to fetch the command(s).

Responsive to determining which particular submission queue 304 from which to fetch the command(s), at step 3, the memory device fetches the command(s) from the particular submission queue 304. In practice, the memory device may access the base address of the particular submission queue 304 plus the pointer on the current head pointer implemented in the host device 300.

As discussed above, the submission queue or completion queue may be assigned an area of memory (such as in the host device or in the controller memory buffer in the memory device). The submission queue and completion queues may include multiple entries, each associated with a specific command. The size of each entry may be a predetermined size, such as 64 kilobytes (Kb). In this regard, entries within the submission queue may be determined using the base address for the submission queue, and by offsetting the base address with the number of entries multiplied by the size of each entry (e.g., 64 Kb).

As discussed above, the memory device is aware of the tail pointer, having been notified via step 2. Thus, the memory device can obtain all of the new commands from the submission queue 304. In a submission queue resident in the host device, the memory device may send a TLP request to obtain the command(s) from the submission queue 304. Responsive to receipt of the TLP request, the host device 300 sends a completion TLP message with the commands in the submission queue 304. In this regard, at end of step 3, the memory device receives the command(s) from the submission queue 304.

At step 4, the memory device processes the command. In one implementation, the memory device parses the commands, and determines the steps to execute the commands (e.g., read/write/etc.). For example, the command may comprise a read command. Responsive to receipt of the read command, the memory device parses the read command, implements the address translation, and accesses the flash to receive the data. After receiving the data, the memory device causes the data to be stored on the host device based on information in the command (e.g., the PRP 1 discussed below). As another example, the command may comprise a write command. Responsive to receipt of the write command, the memory device parses the write command, determines the location of the data on the host device subject to the write, reads the data from the location on the host device, and writes the data to flash memory.

In particular, the memory device may receive a read command or write command with a PRP1 pointer. For example, a read command, in which the host device requests the memory device to read from the flash memory, includes a PRP1 pointer, which points to a PRP list. The memory device obtains the PRP list in order to determine the memory locations within the host device to write the data that was read from the flash memory. As another example, a write command, in which the host device requests the memory device to write data to the flash memory, includes a PRP1 pointer, which points to a PRP list. The memory device obtains the PRP list in order to determine the memory locations within the host device to read the data from (and thereafter save the read data to the flash memory).

Each entry in the PRP list may be associated with a certain section in the host device memory, and may be a predetermined size, such as 4 Kb. Thus, in a 1 megabyte (MB) transfer, there may be 250 references in the PRP list, each 4 Kb in size. In practice, the memory device may retrieve data out of sequence. This may be due to the data subject to retrieval being on several flash dies, with the dies being available for data retrieval at different times. For example, the memory device may retrieve the data corresponding to 100-200 Kb of the 1 megabyte (Mb) transfer before retrieving the data corresponding to 0-100 Kb of the 1 Mb transfer. Nevertheless, because the memory device has the PRP list (and therefore knows the memory locations the host device expects the data corresponding to 100-200 Kb to be stored), the memory device may transfer the data corresponding to 100-200 Kb of the 1 Mb transfer without having first retrieved the data corresponding to 0-100 Kb of the 1 Mb transfer.

In NVMe, there may be a multitude of PCIe TLPs to transfer the data from the memory device to the host device 300. Typically, the transferred data is stored in the host memory 302 of the host device 300 based on an indication in the command (e.g., the command may include an address at which to store the requested data).

After completing the data transfer, at step 5, the memory device controller sends a completion message to the relevant completion queue 306. As mentioned above, at the initialization phase, the host device 300 associates submission queues with completion queues, so that the host device 300 is aware of commands that are completed in the submission queue based on which completion queue the memory device writes to. The completion message may contain information as to the processing of the command(s), such as whether the command was completed successfully or whether there was an error when executing the command.

After step 5, the host device 300 is unaware that the memory device posted to the completion queue 306. This is due to the memory device causing data to be written to the completion queue 306. In that regard, at step 6, the memory device notifies the host device 300 that there has been an update to the completion queue 306. In particular, the memory device posts an interrupt to the host device 300 (e.g., in NVMe, the host device 300 may use a Message Signaled Interrupt enable (MSIe).

Responsive to receiving the interrupt, the host device 300 determines that there are one or more completion entries pending for the host device 300 in this completion queue 306. At step 7, the host device 300 then processes the entries in the completion queue 306.

After the host processes the entries from the completion queue 306, at step 8, the host device 300 notifies the memory device of the entries that the host device 300 processed from the completion queue 306. This may be performed by updating a completion queue head doorbell register 314 indicative to the memory device that the host device 300 processed one or more entries from the completion queue 306. Responsive to updating the completion queue head doorbell register 314, the memory device updates the head of the completion queue 306. Given the new head, the memory device is aware as to which entries in the completion queue 306 have already been processed by the host device 300 and may be overwritten.

Figure 4:
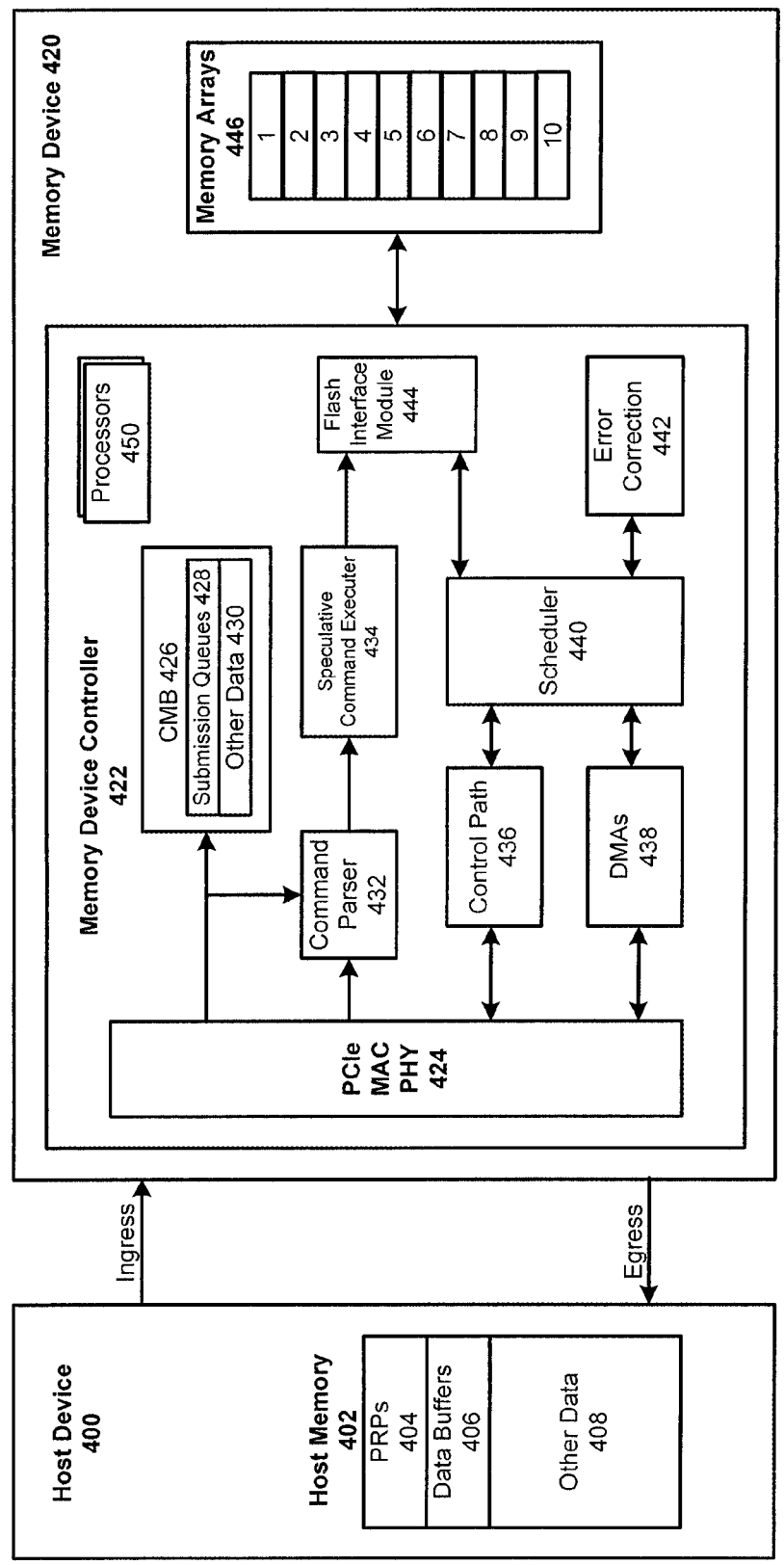
FIG. 4 is a block diagram of other exemplary components of a host device and a memory device.

FIG. 4 is a block diagram of other exemplary components of a host device 400 and a memory device 420. The host device 400 includes host memory 402, which may comprise Physical Region Page (PRP) 404, data buffers 406, and other memory 408.

FIG. 4 further illustrates a communication interface between the host device 400 and the memory device 420. In a first implementation (not illustrated in FIG. 4), the communication interface between the host device and the memory device is simplex, with communications to and communications from the memory device on the same path. In a second implementation (illustrated in FIG. 4), the communication interface between the host device 400 and the memory device 420 is duplex, with a separate ingress path and a separate egress path. The ingress path, from the perspective of the memory device 420, includes incoming requests from the host device 400 to the memory device 420.

Conversely, the egress path, from the perspective of the memory device 420, includes outgoing requests from the memory device 420 to the host device 400.

The incoming requests (requests from the host device 400 to the memory device 420) may be segmented in different ways, such as incoming read requests and incoming write requests. For example, the host device 400 may send, via the ingress path, a read request to read a section of memory in the memory device 420 or a write request to write to a section of memory in the memory device 420. Likewise, the memory device 420 may send, via the egress path, a read request to a section of memory in the host device 400 or a write request to write to a section of memory in the host device 400.

In practice using NVMe, there may be a series of read requests (a request by the host device to read data resident on the memory device, and vice-versa) and a series of write requests (a request by the host device to write data to a location resident on the memory device, and vice-versa). In particular, in NVMe, the memory device and the host device communicate with one another using transaction layer packet (TLP) requests, such as TLP read requests to perform a read on the other device, or TLP write requests to perform a write on the other device. In one example (with the SQ and the CQ resident on the host device), responsive to a TLP write request (sent via the ingress path) by the host device to the doorbell register on the memory device (with the write to the doorbell register indicating that there is a command on the SQ), the memory device uses a TLP read request (sent via the egress path) to fetch the write command from the SQ (which is resident on the host device). Thus, the write command is a request for the memory device to write data to the non-volatile memory. The memory device then parses the write command for information, such as an indication of a PRP pointer (e.g., PRP1) to a PRP list. The PRP list is a series of information, such as pointers or addresses, that indicates the location of the data in the host device. The memory device then uses another TLP read request to read data from the pointers or address in the PRP list. Thereafter, the memory device performs the write by storing the data in non-volatile memory (e.g., flash memory) on the memory device. After storing the data, the memory device uses a TLP write request to write an entry to the CQ (indicating that the write command has been completed). Finally, the memory device uses a TLP write request to generate an interrupt to the host device, with the interrupt signaling to the host device that there is an entry on the CQ. Responsive to the interrupt, the host device reads the entry on the CQ, and then issues a TLP write request to CQ Doorbell Write register indicating that the host device has reviewed the entry on the CQ.

As another example (again with the SQ and the CQ resident on the host device), responsive to a TLP write request by the host to the doorbell register on the memory device (with the write to the doorbell register indicating that there is a command on the SQ), the memory device uses a TLP read request to fetch the read command from the SQ (which is resident on the host device). Thus, the read command is a request for the memory device to read data from the non-volatile memory and to send the read data to the host device. The memory device then reads the non-volatile memory (e.g., flash memory) to read the data. The memory device can perform a series of operations on the data, such as error correction, encryption/decryption, etc., with storage butlers or buffeting between each of the series of operations. The memory device may then parse the read command for information, such as an indication of a PRP pointer (e.g., PRP1) to a PRP list. The PRP list is a series of information, such as pointers or addresses, that indicates the location in the host device to store the data that was read from non-volatile memory (and optionally error corrected, encrypted, etc.). The memory device uses a TLP read request to read data from the pointers or address in the PRP list. Thereafter, the memory device uses a TLP write request to write the data that was read from non-volatile memory. After writing data to the host device, the memory device uses a TLP write request to write an entry to the CQ (indicating that the read command has been completed). Finally, the memory device uses a TLP write request to generate an interrupt to the host device, with the interrupt signaling to the host device that there is an entry on the CQ. Responsive to the interrupt, the host device reads the entry on the CQ, and then issues a TLP write request to CQ Doorbell Write register indicating that the host device has reviewed the entry on the CQ.

Optionally, the CQ and SQ may be resident in the memory device, such as in the Controller Memory Buffer (CMB). In that instance, the host device may send a TLP write request (sent via the ingress path) to the memory device to write to the SQ. Likewise, the memory device may send a TLP write request (sent via the egress path) to generate an interrupt to the host device.

Memory device 420 includes the memory device controller 422 and memory arrays 446. Memory arrays 446 may be segmented in various ways, such as in 10 sections as illustrated in FIG. 4. The memory device controller 422 may incorporate one or all of a PCIe media access control (MAC) and physical layer (PHY) interface 424. The memory device controller 422 may also include one or more processors 450.

The memory device controller 422 further includes the Controller Memory Buffer (CMB) 426 which is allocated for the host device 400. As discussed above, the various queues, including the submission queues and completion queues, may be resident in the host device or in the memory device. As shown in FIG. 4, the queues are resident in CMB 426 in memory device 420, such as the submission queues 428. In addition, CMB 426 may include other data 430.

Command parser 432 is configured to monitor one or more internal buses, such as the bus from PCIe MAC and PHY interface 424 to Controller Memory Buffer (CMB) 426. Command parser 432 is further configured to parse the NVMe commands written by the host device 400 in real-time (or as the commands are transmitted internally within memory device 420) and to select the commands that are candidates for a speculative execution. Command parser 432 may queue those commands in the speculative command executer 434, which may be implemented either in hardware or firmware. As discussed in more detail below, based on resources internal to memory device 420, speculative command executer 434 may start the execution phase of those commands even before formal notice of the commands from host device 400.

Flash interface module 444 is configured to control and access the memory arrays 446. For example, flash interface module 444 may interact with the memory arrays 446 mainly for read and write operations. Scheduler 440 is configured to control the data transfer while activating the control path 436 for fetching PRPs, posting completion (e.g., step 5 in FIG. 3) and interrupts (e.g., step 6 in FIG. 3), and using the DMAs 438 for the actual data transfer between host device 400 and memory device 420. The error correction engine 442 is configured to correct the data fetched from the memory arrays 446.

In one implementation, speculative command execution does not speculatively post any related transaction to the host device 400. Rather, the posting completion may be performed only after command queuing, which may be performed by a write to the relevant doorbell register (see step 3 in FIG. 3).

Though FIG. 4 includes the queues, such as submission queues 428, in CMB 426 resident in memory device 420, speculative execution may be performed when the queues, such as sequential queues are resident in the host device 400. In this case, sequential queues may be stored in Host DRAM. In some applications, it may be beneficial to pre-fetch commands from the next slots in the sequential queues even before the host device 400 provides notice to the memory device 420 (e.g., writes to the doorbell register in step 2 of FIG. 3). In such implementations, the memory device holds internally the previous commands which were queued in the past by the host device 400 in the same slots. When pre-fetching the commands, the memory device 420 may first detect whether new commands are placed in those slots by the host device 400, or the previous commands are still there. If there are new available commands, the memory device 420 may begin the speculative execution even before the host device 400 issues the doorbell write. Thus, the memory device 420 may communicate via PCIe MAC PHY interface 424 to pre-fetch the new commands resident in the submission queues on the host device 400.

Figure 5:
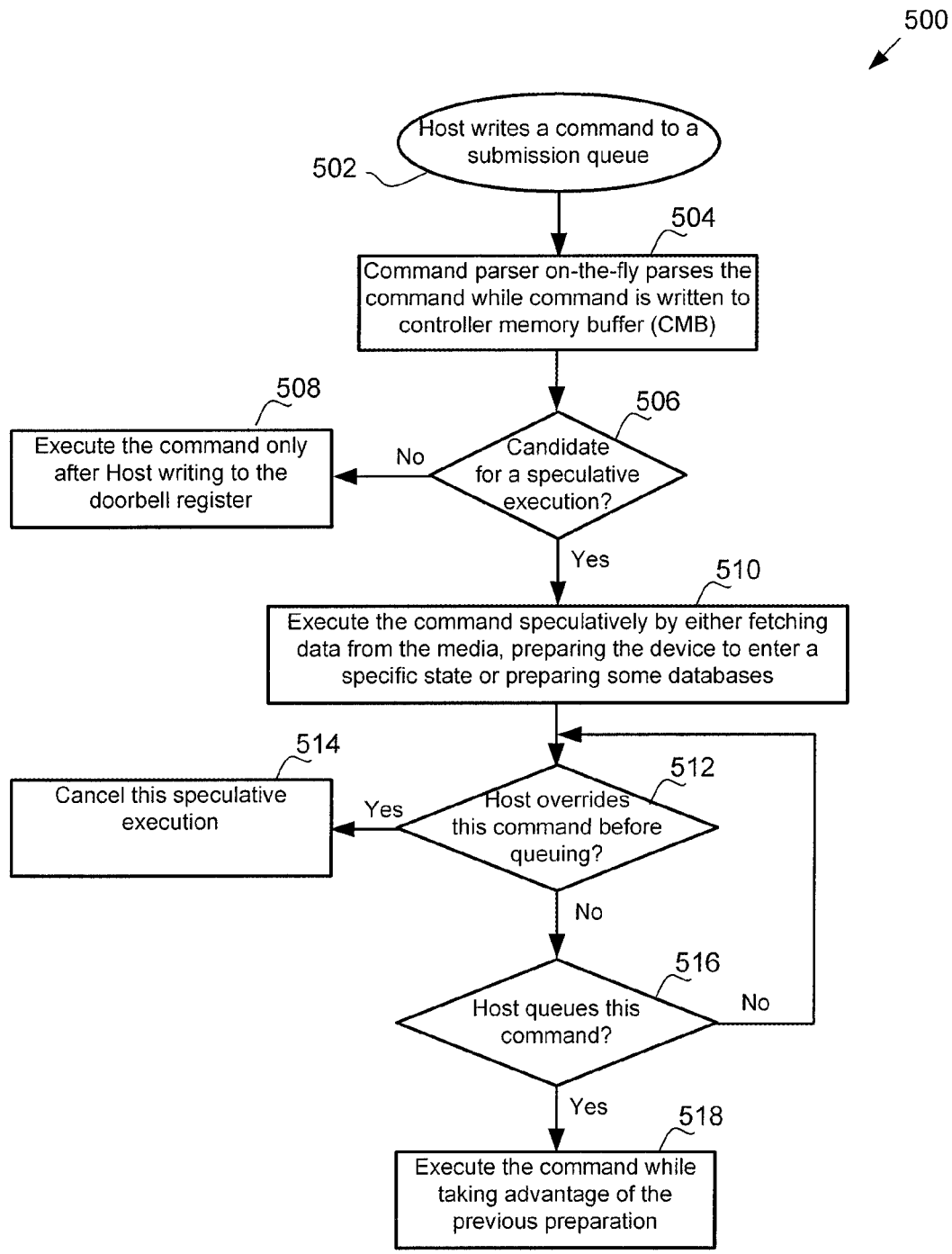
FIG. 5 is a flow chart for speculative execution of a command in the submission queue.

FIG. 5 is a flow chart 500 for speculative execution of a command in a submission queue. At 502, the host device 400 writes a command to the submission queue 428 located in CMB 426. At 504, the command parser 432 parses the command in real-time while the command is written to CMB 426. At 506, the command parser 432 determines whether to speculatively execute the command or not. In particular, the command parser 432 may analyze one or more aspects or features in order to determine whether to perform speculative execution. In one implementation, the command parser 432 analyzes the command itself (e.g., the type of the command) to determine whether to perform speculative execution. As one example, in response to the command parser 432 determining that the command is a read command, speculative execution is performed. In this instance, at 510, the memory device may access the memory array 446 and pre-fetch some (or all) of the data responsive to the read command, prepare to enter a special state or prepare a database. Conversely, there are certain NVMe commands where there is no added value for a speculative execution. In that regard, at 508, execution of these certain NVMe commands will begin only after the host device notifies the NVMe controller of the command by writing to the doorbell register (e.g., via step 2 of FIG. 3).

In another implementation, the command parser 432 analyzes the available internal resources of the memory device 420 to determine whether to perform speculative execution. As one example, in response to the command parser 432 determining that the memory device 420 has sufficient internal resources to perform the speculative execution, the command parser 432 determines to proceed with speculative execution. Conversely, if at a certain point, there are no available resources in the memory device required for execution of the command, the command may be executed later, and even after host command queuing. In still another implementation, the command parser 432 analyzes both the command and the internal resources of the memory device in determining whether to perform speculative execution. Thus, if there are available resources and if the command is a candidate for speculative execution, the memory device will start the speculative execution phase.

There are instances where the host device 400 may override a command after the command is placed in a submission queue 428. Thus, at 512, the memory device determines whether the host device 400 has overwritten the command before queuing it. If so, at 514, speculative execution of the overwritten command is canceled. Otherwise, at 516, it is determined whether the host device 400 has queued the command by writing to the relevant doorbell register (e.g., step 2 of FIG. 3). If not, flow chart 500 loops back to 512 and waits to determine if an overwrite occurred. If, at 516, the host has queued the command the memory device 420 may continue the execution of the command normally, at 518, while taking advantage of the speculative execution. As one example, speculative execution of a read command may comprise reading data from the memory arrays 446 and storing the read data into temporary memory buffers, as discussed with regard to FIG. 6.

Figure 6:
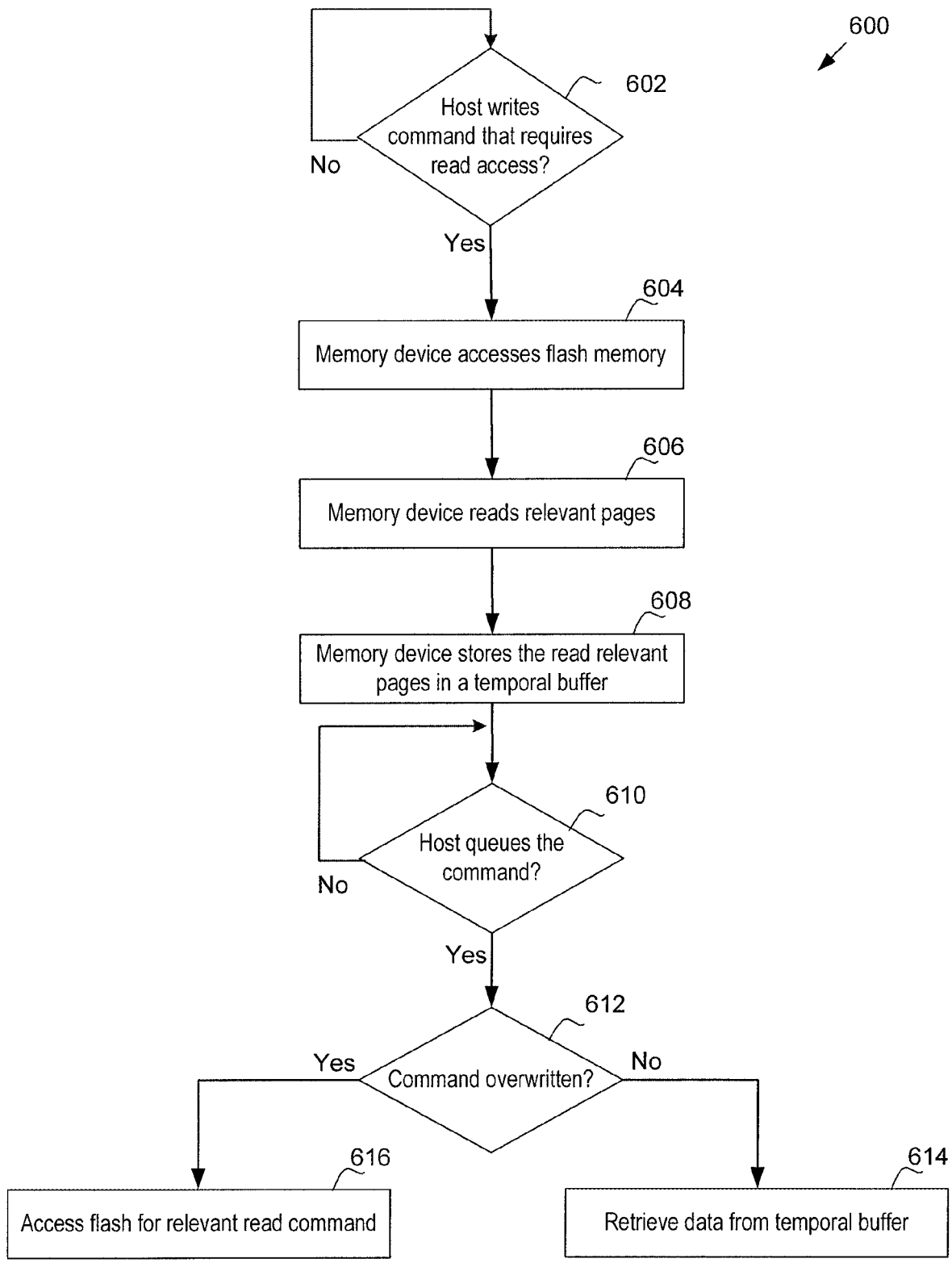
FIG. 6 is a flow chart for speculative execution of a read command in the submission queue.

FIG. 6 is a flow chart 600 for speculative execution of a read command in the submission queue. As discussed above, when the host device 400 writes a command to the submission queue that requires a read access to the flash memory arrays, the read operation may start at this point in a speculative way (e.g., a Read Look Ahead). Thus, at 602, it is determined whether the host device has written a command that requires read access. If so, at 604, memory device controller 422 may access the memory arrays 446; at 606, read the relevant pages; and, at 608, store the read relevant pages in a temporal buffer. As discussed above, data read from the memory arrays 446 (such as the flash memory) may be subject to post-read processing, such as error correction and/or encryption/decryption. For example, the read data may first be analyzed for errors and, using ECC controller 124 (FIG. 2A), correct for errors in the read data. The error-corrected data may then be subject to encryption or decryption, and then stored in the temporal buffer.

At 610, the memory device controller 422 determines whether the host device 400 has queued the command. When the host device 400 queues the command, it is determined whether the command has been overwritten, at 612. If not, the data can be retrieved from the temporal buffer, at 614, rather than fetching it from the flash memory arrays. In this regard, in one implementation, the data stored in the temporal buffer is transmitted to the host only after the host device 400 queues the command in. In a more specific implementation, the memory device may retrieve error-corrected decrypted data from the temporal buffer for transmission to the host device. In this way, the memory device can perform the functions of retrieval, error correction, and encryption or decryption prior to the host device queuing the command (e.g., the host device performing step 2 in FIG. 3).

Conversely, during the time the data is stored in the temporal buffer, the host device 400 may have overwritten the command. In this case, at 614, the new data is provided for the relevant read command.

Because of the speculative execution, when the host device 400 queues the command, the memory device may access the temporary memory buffers to transfer the read data to the host device. This is in contrast to conventional execution of the command, which reads the data from the memory arrays in response to the queuing of the command. Thus, with regard to read commands, the speculative execution may be quicker since reading the data from the temporary buffers is quicker than reading the data from the memory arrays 446. The benefit in this case might be significant since the read performance of low queue depths can be easily increased.

Commands, other than read commands, may be candidates for speculative execution. As one example, write commands may be speculatively executed. In particular, for flash write operations, the speculative execution may comprise fetching the flash translation layer (FTL) table used for address translations (e.g., logical block to physical block translation table). As another example, power management commands may be speculatively executed. In particular, the host device 400 may request the memory device to enter a specific NVMe power state using the Set Features command. The speculative execution in this case may include flushing all internal caches to the flash memory array and other preparation related to this special state. As still another example, flush commands may be speculatively executed. In particular, the host device 400 may send flush commands. In response, the memory device 420 flushes its temporal buffers to the non-volatile media and then posts a completion to the host device 400. For a speculative flush operation, the memory device 420 may start the flush operation as usual. In a worst case scenario, the host device may overwrite the command (e.g., will not queue the command). Nevertheless, even if the memory device 420 performs the flush operation, the memory device 420 has not violated any rule.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method comprising:
   receiving a command from a host device;
   posting the command in a submission queue of a memory device;
   prior to the memory device receiving a notification from the host device that the submission queue has been posted to:
      reading the command from the submission queue; and
      processing the command;
   determining that the host device has notified the memory device that the submission queue has been posted to;
   determining that the host device has overridden the command already processed by the memory device with a different command; and
   in response to determining that the host device has overridden the command:
      reading the different command from the submission queue;
      processing the different command; and
      notifying the host device of completion of the different command via a completion queue.

2. The method of claim 1, wherein:
   the command comprises a read command; and
   processing the command comprises reading data from non-volatile memory and storing the read data in volatile memory.

3. The method of claim 2, wherein processing the command further comprises error correcting the read data.

4. The method of claim 1, wherein:
   the command comprises a flush command indicating to the memory device to flush internal caches to non-volatile memory; and
   processing the command comprises writing at least a part of data in the internal caches to non-volatile memory.

5. The method of claim 4, further comprising:
   determining that the host device has overridden the flush command; and
   in response to determining that the host device has overridden the flush command, canceling writing of the at least a part of the data in the internal caches to the non-volatile memory.

6. The method of claim 1, further comprising:
   after reading the command from the submission queue, determining whether to begin processing the command;
   in response to determining to begin processing the command, processing the command; and
   in response to determining not to begin processing the command, waiting until the host device notifies the memory device that the submission queue has been posted to to begin processing the command.

7. The method of claim 6, wherein determining whether to begin processing the command is based on a type of command.

8. The method of claim 7, further comprising:
   in response to determining that the type of command is a read command, beginning processing the command; and
   in response to determining that the type of command is a write command, waiting to begin processing the command until the host device notifies the memory device that the submission queue has been posted to.

9. The method of claim 1, wherein the memory device comprises a three-dimensional memory.

10. A non-volatile memory device comprising:
    a non-volatile memory;
    a communication interface; and
    a controller in communication with the non-volatile memory and the communication interface, the controller configured to:
       prior to receipt of a notification from a host device that a submission queue in the controller has been posted to:
          read one or more commands from the submission queue;
          determine an operation internal to the memory device to perform in order to process the one or more commands; and
          at least partly perform the operation internal to the memory device to process the one or more commands; and
       after receipt of the notification from the host device that the submission queue has been posted to:
          determine whether the host device has overridden the one or more commands already processed by the memory device with a different command;
          in response to determining that the host device has not overridden the one or more commands:
             determine an operation external to the memory device to perform in order to process the one or more commands;
             perform the operation external to the memory device, wherein the operation external to the memory device comprises communication, via the communication interface, with the host device; and
             notify the host device of completion of the one or more commands via a completion queue; and
          in response to determining that the host device has overridden the one or more commands:

read the different command from the submission queue; and process the different command.

11. The non-volatile memory device of claim 10, wherein:
the one or more commands comprise one or more read commands; and
the operation internal to the memory device comprises reading data from the non-volatile memory.

12. The non-volatile memory device of claim 10, wherein the controller comprises a controller memory buffer configured to store the submission queue;
wherein the controller is further configured to:
determine, prior to receipt of the notification from the host device that the submission queue has been posted to, that the host device has stored the one or more commands in the submission queue in the controller memory buffer; and
responsive to the controller determining that the host device has stored the one or more commands in the submission queue in the controller memory buffer, read the one or more commands from the submission queue in the controller memory buffer and at least partly perform the operation internal to the memory device.

13. The non-volatile memory device of claim 10, wherein the operation external to the memory device comprises sending a transmission layer packet (TLP) read request to read a section of host memory.

14. The non-volatile memory device of claim 10, wherein the operation external to the memory device comprises sending a transmission layer packet (TLP) write request to write to a section of host memory.

15. The non-volatile memory device of claim 10, wherein the non-volatile memory device comprises a three-dimensional memory.

16. A non-volatile memory system comprising:
a non-volatile memory;
a submission queue;
a completion queue;
means for speculative command execution, comprising:
means for speculatively executing a command posted in the submission queue prior to receipt of a notification from a host device that the submission queue has been posted to;
means for determining whether the host device has overridden the command that was speculatively executed with a different command;
means for determining whether the host device has queued the command that was speculatively executed in response to determining that the host device has not overridden the command;
means for cancelling speculative execution of the command posted to the submission queue in response to determining that the host device has overridden the command; and
means for executing the command in response to determining that the host device has queued the command; and
means for notifying the host device of completion of the command via the completion queue.

17. The non-volatile memory system of claim 16, wherein the non-volatile memory comprises a three-dimensional memory.

18. The memory system of claim 16, wherein the means for speculative command execution further comprises means for determining whether to speculatively execute the command by considering a type of the command.

19. The memory system of claim 18, wherein the type of the command is a read command or a write command.

* * * * *